Patented Apr. 3, 1923.

1,450,493

UNITED STATES PATENT OFFICE.

CARLETON ELLIS AND ALFRED A. WELLS, OF MONTCLAIR, NEW JERSEY, ASSIGNORS, BY MESNE ASSIGNMENTS, TO SETH B. HUNT, TRUSTEE, OF MOUNT KISCO, NEW YORK.

KETONE BODY AND PROCESS OF MAKING SAME.

No Drawing.  Application filed January 28, 1918.  Serial No. 214,082.

*To all whom it may concern:*

Be it known that we, CARLETON ELLIS and ALFRED A. WELLS, citizens of the United States, and residents of Montclair, in the county of Essex and State of New Jersey, have invented certain new and useful Improvements in Ketone Bodies and Processes of Making Same, of which the following is a specification.

This invention relates to oxidation products of alcohols, etc., derived from petroleum material and relates especially to such products produced from alcohols obtained by cracking an oil to produce unsaturated hydrocarbons, sulphating the latter by treatment with sulphuric acid and hydrolyzing the acid extract or alkyl hydrogen sulphate. The procedure herein may also be applied to shale oil olefines or similar unsaturated bodies. The process herein is applicable to unsaturated bodies of high or low boiling point but as an illustration a procedure will be set forth for utilizing still gases, compressor gas naphtha, etc., to produce ketones useful as solvents for many purposes, including nitrocellulose, acetyl cellulose, oils, varnishes, resins and the like. A specific illustration is the following—

Heavy petroleum oil, residuum, and heavy ends of various sorts are cracked primarily to make gasoline. The still gases evolved contain much unsaturated material which is sulphated and converted into alcohol and ketone as is noted hereinafter. Or the gases may be compressed to collect a portion of the gasoline with which they are saturated and the compressor gases sulphated, that is the unsaturated bodies in whole or part extracted with sulphuric acid.

For example heavy oil is cracked in a pressure still under a pressure of 60 or 75 lbs. and the distillate is condensed under pressure. This crude distillate is then redistilled at atmospheric pressure when large quantities of gases and vapors are liberated which are not readily condensed. These gases and vapors are compressed, preferably in two stages, the first compressor running at about 40 lbs. per square inch when a portion of the gases are liquefied and separated. The remaining gases are then further compressed when a second portion of lighter liquids are obtained. The remaining gases contain a goodly percentage of unsaturated material often varying from 10 to 20%.

In one form of the present process these gases are passed through a tower containing pebbles or similar material, while a slow stream of sulphuric acid of about 1.8 specific gravity is trickled over the pebbles thus bringing about counter current absorption. The sulphuric acid combines with the unsaturated material in the gases and is drawn off at the bottom in the form of acid extract.

In place of passing the gases through a tower packed with the pebbles they may be bubbled through a mass of sulphuric acid and the sulphated material drawn off intermittently. The acid extract is diluted with preferably twice its volume of water and distilled, when alcohols will be formed which have a range of boiling points of from approximately 75–100° C. These alcohols are entirely soluble in water and may be dried by distilling from lime or by other methods ordinarily used in the art. It has been found that these alcohols, when oxidized by a mild oxidizing agent such as for example sodium bichromate in dilute solution yield ketones.

In one experiment the oxidation was carried out as follows:—

65 parts of sodium bichromate was dissolved in water and made up to an 8% solution. 50 parts of mixed alcohols as above, were dissolved in one-half of this solution, and 100 parts of 66° Bé. sulphuric acid were dissolved in the remainder. The alcohol solution was placed in an acid proof container and the sulphuric acid solution run in slowly. During this operation the material became slightly warm due to the reaction, which was allowed to proceed for about one-half hour. At the end of this time the temperature was gradually raised to 80° C. and held at this point for one and one-half hours. The product was then distilled until the ketones formed had distilled over. About an equal volume of water came over with the crude ketones, which was separated by rectification. The rectified ketones were found to have a boiling point ranging from 72 to 75° C. and had a gravity of .806. The rectified ketones were further dried by placing a small amount of calcium chloride in the container and allowing to stand for some time. When treated with twice its volume of a saturated solution of sodium bisulphite the mass solidified in the form of crystals in less than five minutes. When treated with ammoniacal silver nitrate no precipitate or mirror was formed showing that the product was ketonic and not aldehydic. Cellulose acetate and nitrocellulose were very readily dissolved in the dried product. The original alcohol shows no such active solvent properties.

The same reaction may be applied to the liquid hydrocarbons obtained by compressing the gases at the 40 lb. or higher pressure stage which show a gravity of from 88 to 90° Bé., depending upon the temperature of the water in the cooling coil. This material has a boiling point range of from about 40 to 90° C. When agitated with sulphuric acid having a gravity of 1.8, the acid extract withdrawn, mixed with water and distilled alcohols which have a boiling point range of from about 90° to 135° C. are obtained. The larger portion of these alcohols is insoluble in water.

When this alcoholic mixture is treated with an oxidizing agent the same as described above, a ketone is formed which is only slightly soluble in water but which forms a crystalline body with sodium bisulphite. With this higher ketone, however, cellulose acetate is only very slightly soluble while nitrocellulose is readily soluble.

It has also been found that in place of converting the acid extract into alcohols and then oxidizing to form the ketone that the olefines of the acid extract may be directly converted into ketones. The fixed gases from the compressor plant or the liquids condensed from the gases by compression may be extracted with sulphuric acid of a gravity of 1.8 and the acid extract withdrawn. In place of being mixed with water and the alcohol distilled off the acid extract may be added directly to a dilute solution of sodium bichromate and heated to 80° C. for from one to two hours at the end of which time the ketone may be distilled off directly.

In one experiment 65 parts of sodium bichromate was dissolved in water and made up to 800 parts. 160 parts by weight of acid extract (which corresponded to 50 parts of olefines and 110 parts of sulphuric acid of 1.8 specific gravity) were slowly added. The temperature did not rise to any marked degree during this addition. The temperature was then gradually raised to 80° C. and held at this temperature for one and one quarter hours, when the ketones were distilled over. The distillate was then further purified by redistillation and dried over calcium chloride. The product formed crystals with sodium bisulphite and in other ways agreed with the product obtained by oxidizing the alcohols.

It should be stated that in preparing the acid extract it is desirable to use slightly diluted sulphuric acid and a strength represented by 1.8 specific gravity has been found suited for the purpose. In producing the sulphated material the temperature should preferably be kept between 10 and 20° C., and in a case of gasoline vigorous agitation is desirable. With still gases a tower may be used, down through which the sulphuric acid is sprayed. In other cases the still gases may be bubbled through a body of sulphuric acid. It should be the endeavor in the preferred procedure to secure as concentrated an acid extract as possible. Whether the olefine material is present partly or entirely in the form of alkyl sulphuric acid or is partly or entirely in a state of mere solution in the sulphuric acid is not a matter for extended discussion here. It suffices to state that the acid extract will produce alcohols on hydrolysis as by dilution with water and distillation with steam, which substantially corresponds to the unsaturated components of the gasoline which have been extracted by the sulphuric acid. Of course there is a small amount of polymerization and side reactions proceeding to a greater or less extent depending on the temperature, but in the main alcohols are formed corresponding to the olefines or other unsaturated material taken up by sulphuric acid and consequently by oxidation of these alcohols, ketones are formed likewise corresponding fairly well with the unsaturated bodies absorbed by the sulphuric acid. In like manner when the acid extract is directly oxidized the ketone bodies or other oxidation products obtained, correspond substantially to the unsaturated components of the particular fraction of gasoline extract with the sulphuric acid. The oxidation of the acid extract directly is carried out simply and constitutes a very effective and cheap method of bringing oxygen or other oxidizing agents into direct contact with the components of the gasoline held by the sulphuric acid. While the gasoline bodies or still gases themselves are of course, very volatile or are vapors or fixed gases respectively at ordinary temperature, in the form of alkyl sulphuric acid or in the condition existing in the acid extract they are not readily volatile and the material remains fixed permitting the action of an oxidizing agent to be sufficiently exerted. Being capable of dilution with water in many cases such acid extracts may be sufficiently diluted to allow of selective oxidation or the use of oxidizing agents which otherwise might not act readily with a compound insoluble in water.

In addition to the chromic acid oxidizing agent used herein simply for illustrative purposes, other oxidizing agents such as nitric acid, hypochlorous acid, air or oxygen and the like may be used. The acid extract may be agitated with oxygen or an oxygen containing gas in the presence of a catalyzer such as finely divided platinized charcoal to yield oxidation products.

In the case of the product derived by the first illustration given herein and which is a remarkably effective solvent for acetyl cellulose, consequently having a promising application in airplane varnishes, etc., the major solvent is apparently methyl ethyl ketone accompanied by other ketones such as acetone or diethyl ketone, etc., and in some cases with more or less non-oxidized alcohol depending on the method of oxidation, hence we do not wish to limit ourselves to a product of a wholly ketonic character, but wish to embrace solvent mixtures or other oxidation products of a more or less composite character, in some cases being entirely ketonic, in other cases being mixtures of ketones and alcohols, and still in other cases being either of these mixtures with some saturated or unsaturated hydrocarbons that may have been carried along in the acid extract or have been regenerated during the operation. The invention also embraces higher oxidation products resulting from more protracted oxidation or the use of more powerful oxidizing agents such for example as potassium permanganate.

As stated above a variety of oxidizing agents may be used, in the case of permanganate of potash the control of the operation is somewhat difficult unless quite dilute solutions are used, and with permanganate in any material strength organic acids are produced by progressive oxidation of the unsaturated bodies. In the case of hypochlorous acid acting on the alkyl sulphuric acid, it is not necessary to take the same care to dilute the reagent in order to avoid excessive oxidation. For example, in one case the process was carried out using the reactive ingredients in the following proportions. One litre of substantially pure olefines was dissolved in one litre of sulphuric acid, having a specific gravity of 1.8. Two litres of a 10% solution of sodium hypochlorite were placed in a flask fitted with a reflux condenser and a dropping funnel, the mixture of olefines and sulphuric acid was then slowly run into the sodium hypochlorite solution. The reaction began at once as shown by a rise in temperature, although it did not become violent at any stage. After the reaction had ceased as shown by a fall in temperature in the flask, the temperature was raised to about 80 to 90° C. and kept at this temperature for about one hour, the hydrocarbon material was then separated and found to consist mainly of ketones together with a small amount of fatty acids. In our claims the expression "cracked gasoline" is made use of to designate gasoline made by cracking.

What we claim is:—

1. The process of producing mixed ketones which comprises exposing alkyl sulphuric acid compounds corresponding to olefines of cracked gasoline to the action of an oxidizing agent comprising chromic acid.

2. The process of producing mixed oxidation products which comprises exposing alkyl sulphuric acid corresponding to olefines of cracked gasoline to the action of an oxidizing agent.

3. The process of producing ketones which comprises exposing alkyl sulphuric acid to an oxidizing agent.

4. The process of making oxidation products of mineral oils which comprises extracting cracked mineral oils with sulphuric acid and in acting on the extract with an oxidizing agent.

5. The process of making oxidation products of petroleum which comprises extracting cracked petroleum with sulphuric acid of a strength corresponding to about 1.8 specific gravity, and in acting on the extract with an oxidizing agent.

6. The process of making oxidation products of petroleum which comprises extracting still gases of petroleum with an acid comprising sulphuric acid and in acting on the extract with an oxidizing agent.

7. The process of making ketone products of petroleum which comprises extracting still gases with sulphuric acid and in acting on the extract with an oxidizing agent.

8. The process of making ketones which comprises reacting on an olefine from shale oil with an extracting agent containing sulphuric acid and in oxidizing the product of the reaction.

9. As a new product a mixture of ketones substantially corresponding to the unsaturated components of cracked gasoline.

10. As a new product a mixture of oxidation products comprising ketones corresponding to the unsaturated components of still gases of hydrocarbon oils.

11. As a new product a mixture of ketones substantially corresponding to the heavier olefines of still gases of petroleum.

12. As a new product a mixture of ketones corresponding to the olefines of still gases and vapors from petroleum oil cracking stills operated under a pressure greater than atmospheric containing primarily methyl ethyl ketone.

CARLETON ELLIS.
ALFRED A. WELLS.